Figure 1:
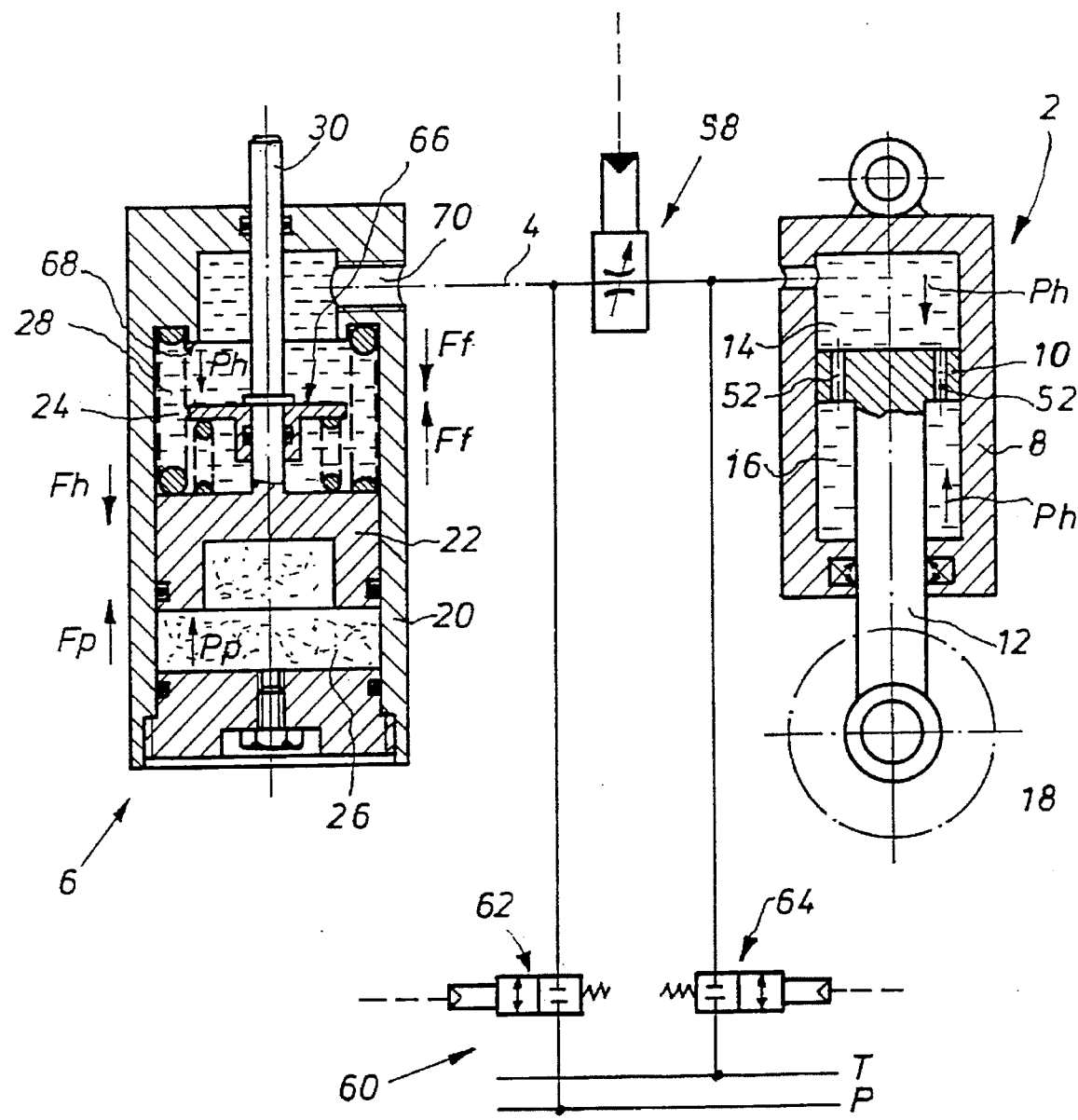

United States Patent [19]
Runkel

[11] Patent Number: 5,624,105
[45] Date of Patent: Apr. 29, 1997

[54] HYDROPNEUMATIC SUSPENSION SYSTEM

[75] Inventor: Walter Runkel, Wuppertal, Germany

[73] Assignee: Hemscheidt Fahrwerktechnik GmbH & Co., Wuppertal, Germany

[21] Appl. No.: 416,778

[22] PCT Filed: Oct. 11, 1993

[86] PCT No.: PCT/EP93/02779

§ 371 Date: Apr. 10, 1995

§ 102(e) Date: Apr. 10, 1995

[87] PCT Pub. No.: WO94/08808

PCT Pub. Date: Apr. 28, 1994

[30] Foreign Application Priority Data

Oct. 10, 1992 [DE] Germany ..................... 42 34 217.1
May 1, 1993 [DE] Germany ..................... 9306581 U

[51] Int. Cl.$^6$ .................. B60G 17/04; B60G 11/30; F16F 9/06; F15B 1/24
[52] U.S. Cl. .................. 267/64.15; 138/31; 188/314; 267/64.25; 280/708
[58] Field of Search ............... 267/64.15, 64.25, 267/64.11–64.28, DIG. 1, DIG. 2, 118, 64.16–64.22; 280/708, DIG. 1, 840, 6.12; 244/104 FP; 188/318, 312, 311, 314, 298, 299, 297; 138/31; 303/87

[56] References Cited

U.S. PATENT DOCUMENTS

| | | |
|---|---|---|
| 2,937,663 | 5/1960 | Ashton et al. |
| 4,153,237 | 5/1979 | Supalla ..................... 188/314 |
| 5,052,712 | 10/1991 | Raidel . |
| 5,246,247 | 9/1993 | Runkel et al. ..................... 280/708 |

FOREIGN PATENT DOCUMENTS

| | | |
|---|---|---|
| A0052782 | 6/1982 | European Pat. Off. . |
| 1094209 | 5/1955 | France . |
| 2116913 | 10/1972 | Germany . |
| 3139600 | 4/1983 | Germany . |
| 0425876 | 5/1991 | Germany . |
| 3936034 | 5/1991 | Germany . |
| 3281418 | 12/1991 | Japan ..................... 188/314 |
| A9305971 | 4/1993 | WIPO . |

OTHER PUBLICATIONS

Patent Abstracts of Japan, vol. 7, No. 261 (M–257) Nov. 1983; JP,A,58 152 048 (Hatsudoki) Aug. 1983.

Patent Abstracts of Japan, vol. 13, No. 376 (M–862) Aug. 1989; JP,A,01 131 346 (Kayaba Ind. Co.) Mar. 1989.

Primary Examiner—Douglas C. Butler
Attorney, Agent, or Firm—Jones & Askew

[57] ABSTRACT

The invention pertains to a hydropneumatic suspension system, in particular for motor vehicles, with at least one hydraulic strut (2) that acts upon at least one hydropneumatic piston-type accumulator (6) during deflection and rebound movements. The piston-type accumulator (6) has a separating piston (22) that separates the hydraulic accumulator chamber (24) from a spring chamber (26) containing a compressible medium, in particular a gas. A hydraulic pressure ($P_h$) acts upon the separating piston (22) from the side of the accumulator chamber (24) and a pneumatic pressure ($p_p$) acts upon the separating piston from the side of the spring chamber (26), with at least one supplementary spring force ($F_F; F_{F1}; F_{F2}$) acting upon the separating piston (22) of the piston-type accumulator (6) in addition to the forces ($F_h, F_p$) resulting from charging the separating piston (22) with the hydraulic pressure ($P_h$) and the pneumatic pressure ($p_p$). This supplementary spring force is generated by at least one spring element (28;34;36) that is arranged outside of the spring chamber (26).

11 Claims, 6 Drawing Sheets

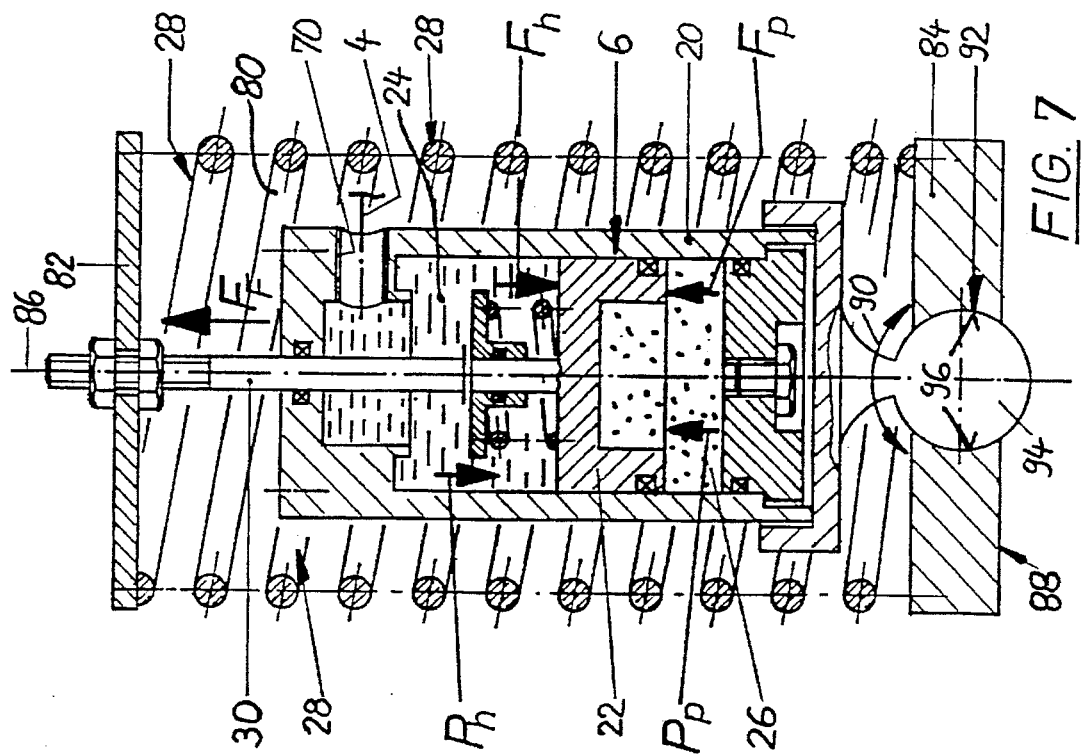
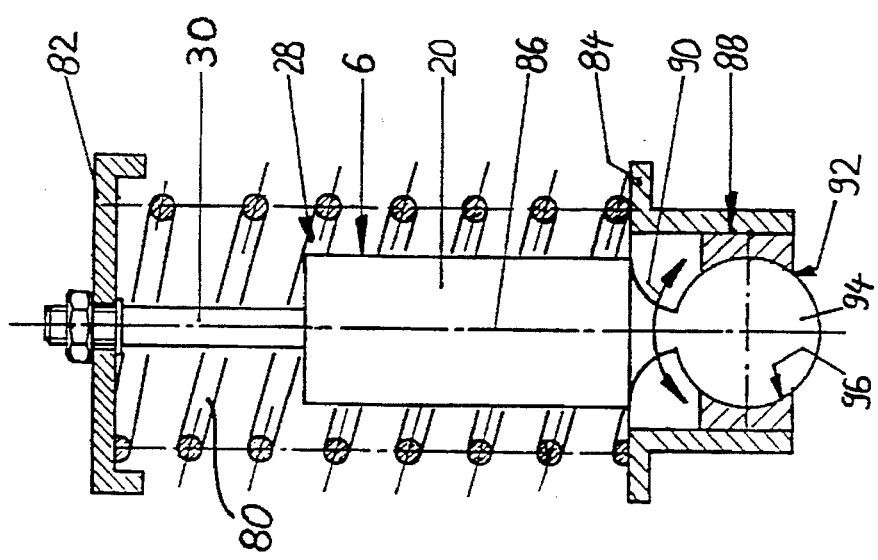

HYDROPNEUMATIC SUSPENSION SYSTEM

The present invention pertains to a hydropneumatic suspension system, in particular for motor vehicles, comprising at least one hydraulic strut that during its deflection and rebound movements acts via a hydraulic medium upon at least one hydropneumatic piston-type accumulator that has a separating piston which separates a hydraulic accumulator chamber from a spring chamber that contains a compressible medium, in particular a gas, with a hydraulic pressure that originates from the accumulator chamber and a pneumatic pressure that originates from the spring chamber acting upon said separating piston, and with at least one supplementary spring force acting upon the separating piston of the piston-type accumulator in addition to the forces resulting from charging the separating piston with the hydraulic pressure and the pneumatic pressure.

In hydropneumatic suspension systems, a hydraulic medium is displaced during the deflection and rebound movements of the strut, i.e., due to movement of a piston inside of a cylinder. When deflecting the strut, a certain volume of the hydraulic medium flows into the accumulator chamber of a hydropneumatic accumulator such that the volume of a compressible medium, usually a gas, that is contained in said hydropneumatic accumulator is reduced. This compression causes a pressure increase and consequently an elastic spring effect that subsequently causes a backflow of the hydraulic medium for the rebound movement of the strut. In a static position of the strut, the pneumatic pressure generates via the hydraulic medium a supporting force for carrying the respective load inside the strut.

The essential advantage of hydropneumatic suspension systems can be seen in the fact that nearly constant suspension characteristics can be attained even under changing load ratios (ratio between the empty load and the full load of the strut) due to the fact that the level of the motor vehicle and consequently also the available travel of the strut can practically be maintained constant by means of a hydraulic leveling process, i.e., by introducing or removing the hydraulic medium. This means that it is practically possible to attain a suspension that does not depend on the load. Consequently, systems of this type are primarily suitable for motor trucks in which a high load ratio usually occurs.

However, this high load ratio is associated with the disadvantage that it requires that the compressible medium has a very large total volume such that the entire load ratio of the strut can be absorbed by the spring chamber or the medium contained therein while causing the smallest possible pressure changes (volume changes of the compressible medium) and—for reasons of comfort—attaining a flat, "smooth" characteristic line. However, this requires a very large structural size of the spring chamber with a long displacement path of the separating piston. This can cause installation problems in a motor vehicle and naturally is also associated with excessive costs regarding the accumulator.

U.S. Pat. No. A 4,153,237 discloses a suspension system of the initially mentioned type in which a helical pressure spring which charges the separating piston with a supplementary spring force that acts in the direction of the pneumatic pressure and opposite to the hydraulic pressure is arranged inside of the spring chamber, i.e., inside of the pneumatic pressure medium, in order to influence the spring characteristics of the piston-type accumulator. However, this is associated with the disadvantage that the helical spring substantially limits the range of travel of the separating piston in the direction of the spring chamber such that the pneumatic medium cannot be compressed arbitrarily. Consequently, the spring characteristics cannot be easily adjusted to arbitrary requirements.

European Patent No. A 0,052,782 (or the corresponding U.S. Pat. No. A 4,478,431) discloses one additional suspension system in which at least two accumulators are provided for each strut. In a few of the respective embodiments, one of the accumulators provided is designed as a piston-type accumulator, the separating piston of which is additionally charged by a spring that is arranged in the gas chamber. The adaptation of the spring characteristic is quite difficult due to the at least two respective accumulators provided.

In a suspension system disclosed in German Patent No. A 3,936,034, it is proposed to design the piston-type accumulator as a pressure transducer, namely in such a way that the pneumatic pressure of the compressible medium in the spring chamber is always less intense than the hydraulic pressure inside of the accumulator chamber as well as inside of the strut. According to one additional development of this invention, the movement of the piston inside of the cylinder of the strut should be transferred onto the separating piston via the displaced hydraulic medium (intensifying of the hydraulic pressure) with a certain path increasing or reducing the ratio.

One additional hydropneumatic suspension system is disclosed in German Patent No. A 4,008,831. According to this publication, the piston of the strut divides two pressure chambers inside of the cylinder by means of its piston seal, namely an annular chamber that encloses a piston rod and a "load bearing" cylinder chamber that is situated opposite to the piston rod, with both of these pressure chambers being hydraulically connected with one respective, separate spring chamber independently from one another. One spring chamber produces a first hydraulic pressure inside of the cylinder chamber which generates a supporting force (carrying force) by charging the corresponding pressure surface of the piston, with the other spring chamber charging the annular chamber and the pressure surface of the piston that faces said annular chamber with a second hydraulic pressure such that a force that acts opposite to the supporting force is generated. In this known suspension system, the load ratio to be absorbed by the "load bearing" spring chamber is reduced by this counter force that acts as an "artificial load" due to the fact that said counter force always acts in addition to the respective load that is actually present. A load ratio of, for example, 1:10 would result without this counter force at an empty load of, for example, 6 kN and a full load of, for example, 60 kN. In this case, a load ratio of 16 kN:70 kN=1:approximately 4.4 would be obtained if a counter force of, for example, 10 kN that acts in the load direction would be generated. Although this measure allows a reduction of the structural size of the load bearing spring chamber or its required gas volume, the fact that a total of two spring chambers (per strut) are required represents a certain disadvantage since a spring chamber is a relatively expensive component due to its construction design, in particular the required seals. In addition, sealing problems within the region of the piston seal of the strut may occur because said piston seal is charged with the respective hydraulic pressures from both sides. These two hydraulic pressures usually differ slightly such that the piston seal only needs to provide a seal against a small differential pressure. However, in order to provide a reliable seal, a piston seal needs to be charged with a certain minimum pressure on one side. This is the reason why leaks might occur inside of the strut of this known suspension system due to the fact that the hydraulic medium is transferred from the cylinder chamber into the annular chamber or vice versa via the piston seal such that an undesired change of the spring characteristic results. In addition, the generation of the counter force within the region of the strut also causes the undesirable side effect that, in the case of a leveling process in which the strut is, for example, moved to a nominal static level (usually approximately in the central position of its travel) by introducing the hydraulic medium during a load increase, the respective counter force increases since a raising of the level is always associated with a volume reduction of the annular chamber of the strut and consequently with a pressure increase in the corresponding chamber. Consequently, the device that generates the hydraulic pressure, usually a pump, needs to be very powerful; this means that a pump capacity in excess of 200 bar, e.g., between 230 and 250 bar, can be required in motor trucks.

The present invention is based on the objective of simplifying a suspension system of this type with respect to its construction, reducing the financial expenditures for its components and improving said suspension system in such a way that an arbitrary and constant, optimal spring characteristic can be attained with simple means.

According to the invention, this objective is attained with the characteristics disclosed in claim 1. Advantageous developments and special embodiments of the invention are described in the dependent claims.

The invention makes it possible to compress the compressible medium inside of the spring chamber almost arbitrarily, which is the reason why an adjustment of the resulting spring characteristic within a very broad range is possible in association with charging the separating piston with the supplementary spring force. In addition, the invention provides substantial advantages as compared to the state of the art, in particular U.S. Pat. No. A 4,153,237; these advantages will be discussed in detail in the following description.

The effective supplementary spring force influences the volume of the compressible medium—in addition to the "normal" volume changes caused by the loads and the spring travel—in such a way that the total volume of said compressible medium can be advantageously reduced. The reason for this can be seen in the fact that the supplementary spring force adjusts a load ratio (or a compression and pressure ratio that-deviates from the "normal" conditions that exist without the supplementary spring force) that differs from the load ratio of the strut for the piston-type accumulator or its spring chamber, with this "accumulator load ratio" being substantially smaller than the load ratio of the strut. This means that the entire accumulator can be constructed in a more compact fashion such that a shorter travel of the separating piston is attained.

Due to the aforementioned reasons, the disadvantageous generation of a counter force within the region of the strut as it is known from German Patent No. A 4,008,831 becomes unnecessary. During the leveling process, the pump only needs to generate a pressure that corresponds with the actual load, so that a maximum pump capacity of 200 bar suffices in all instances. In addition, only one accumulator per strut is required. This is advantageous because the same hydraulic pressure is present in the two pressure chambers of the strut, so that the aforementioned sealing problems are eliminated. Alternatively, it is also possible to connect the annular chamber with the atmosphere via a ventilation opening, so that the aforementioned sealing problems are also eliminated in this instance because the piston seal is able to provide a seal against a high differential pressure.

In a first embodiment of the invention, the supplementary spring force charges the separating piston in the direction of the spring chamber, i.e., in the direction of the "hydraulic force," namely in such a way that the supplementary spring force is more intense at a small load of the strut and a correspondingly less intense hydraulic pressure than at a higher load and a correspondingly higher hydraulic pressure. This means that the supplementary spring force according to the invention additionally compresses (reduces the volume of) the compressible medium in an "artificial" fashion, i.e., in addition to the normal load, with said "artificial compression" being relatively more intense at a small load than at a high load. In this embodiment, the effective direction of the supplementary spring force extends exactly opposite to the one according to the state of the art (U.S. Pat. Nos. A 4,153,237, A 4,478,431), so that the spring element may, for example, be arranged inside of the accumulator chamber in the form of a pressure spring so as to realize the arrangement of the spring element "outside of the spring chamber" according to the invention.

According to a second embodiment, the supplementary spring force charges the separating piston in the direction of the accumulator chamber, i.e., in the direction of the "pneumatic force," namely in such a way that the supplementary spring force is less intense at a smaller load of the strut and a correspondingly smaller hydraulic pressure than at a higher load and a correspondingly higher pressure. Consequently, this pertains to an "artificial expansion" (volume increase) of the compressible medium as compared to the conditions under a "normal load," with this "artificial expansion" being relatively more intense at a high load than at a small load. This effective direction essentially corresponds with the state of the art (compare in particular to U.S. Pat. No. A 4,153,237), but the spring element according to the invention is arranged "outside of the spring chamber." This is preferably realized by providing the separating piston with a sealed separating piston rod that extends out of the piston-type accumulator, with at least one spring element engaging said separating piston rod so as to be able to charge the separating piston with the supplementary spring force via the separating piston rod. This advantageous measure naturally may also be applied in the first embodiment if the supplementary spring force acts in the same direction as the hydraulic force, i.e., opposite to the pneumatic force.

According to one particularly advantageous development of the invention (third embodiment), the separating piston is charged with one respective supplementary spring force in both directions, namely by means of external spring elements via a separating piston rod of the separating piston. In this case, a resulting supplementary spring force is obtained from the sum (difference) of these two spring forces that act in opposite directions, namely in such a way that said supplementary spring force reduces the pneumatic pressure that corresponds with a high load of the strut and increases the pneumatic pressure that corresponds with a small load of the strut. Due to this preferred measure, the volume of the compressible medium required for the respective load ratio of the strut is reduced in a particularly effective fashion as elucidated below in a simple numerical example.

At a given load ratio and design of the suspension system that is hot provided with the measures according to the invention, the pressure in a spring chamber with a volume of 1000 cm$^3$ amounts to, for example, 150 bar in the loaded condition and, for example, 40 bar in the empty condition. The pressure ratio 150 bar:40 bar results in a factor of 3.75 that must be multiplied with the volume in the loaded condition ("load volume") in order to obtain the volume in the empty condition ("empty volume"); this means that an empty volume of 1000 cm$^3$×3.75=3.750 cm$^3$ is required in the empty condition.

However, the supplementary spring force according to the invention reduces the "loaded pressure" to a value of, for example, 100 bar and increases the "empty pressure" to a value of, for example, 60 bar such that a ratio factor of 100:60=1.667 is obtained. At the aforementioned "load volume" of 1000 cm$^3$, this results in a reduction of the "empty volume" to only 1000 cm$^3$×1.667=1667 cm$^3$. The volume of the compressible medium required for the load ratio of the strut consequently may be substantially reduced with the measures according to the invention, namely by more than 50% in the previously described example.

The reduction of the gas volume in the empty condition also causes the spring stiffness c to become more intense in the empty condition, so that the natural frequency of the system also remains practically identical in the loaded condition and in the empty condition. In comparison to a large "empty gas volume" that existed most of the time in customary systems, a large difference between the natural frequency in the loaded condition and the empty condition is always obtained due to less intense spring stiffness.

Due to the process of influencing the pressure ratios inside of the piston-type accumulator by means of the supplementary spring force, it may—in dependence on the respective design of system parameters (in particular the resulting characteristic line of the supplementary spring force)—occur that the pneumatic pressure becomes more intense than the hydraulic pressure beginning at a certain load. In this case, the separating piston needs to be equipped with a special "gas seal." Naturally, the system also may be designed in such a way that the pneumatic pressure is always less intense or no more than identical to the hydraulic pressure, so that a simpler "oil seal" suffices for the separating piston.

The supplementary spring force according to the invention can be generated by different means, e.g., with mechanical pressure and/or tension springs or with hydropneumatic springs (accumulators). A few advantageous possibilities are described in detail in the following description of preferred embodiments.

The invention provides substantial advantages as compared to the state of the art. In particular the preferred measure of allowing a spring element to act upon the separating piston via a separating piston rod that extends out of the accumulator represents a considerable technological advance because the spring element that charges the separating piston(s) is arranged externally, i.e., outside of the accumulator, as compared to an internal arrangement of a mechanical spring in the gas chamber—e.g., in accordance with U.S. Pat. No. A 4,153,237. Among other things, this measure provides the following important advantages:

1. If one intends to alter the spring characteristics, the spring element(s) may be exchanged simply without having to disassemble the accumulator.

If the spring were inside of the gas chamber, the accumulator would have to be disassembled in order to exchange each spring and reassembled with a high sealing cost after the spring is exchanged. In addition, an exchange of the spring elements also stresses the sealing surfaces, so that the accumulator may be rendered unusable after several exchanges of the spring (which might be required for adapting the spring characteristics).

2. According to the invention, possible damages within the region of the spring element that charge the separating piston are easily detectable from the outside. A fracture of a mechanical spring is, for example, immediately visible; the broken spring can be easily replaced (compare to 1.).

In the known internal arrangement, a broken spring cannot be detected immediately, but different spring characteristics would be noticed for no apparent reason. The diagnosis indicating a broken spring can only be made after a time-consuming and costly search for the defect and after disassembling the accumulator. Until this diagnosis is made, the inner surfaces of the accumulator undoubtedly would already be damaged by the sharp edges within the region of the fracture of the spring such that the accumulator would be rendered unusable.

3. In order to adjust the spring characteristics, it is frequently required to alter the pneumatic pressure, with said fact inevitably causing a change of the supplementary spring force that charges the separating piston because said separating piston is displaced correspondingly during this process. This change in the spring force cannot be compensated for if the spring element is internal.

According to the invention, the preferred external arrangement of the spring element(s) makes it possible to change this prestress via adjusting means, so that a change in the spring prestress that is caused by a change of the pneumatic pressure (due to the displacement of the separating piston) can be compensated for arbitrarily. In addition, tolerances caused by the manufacturing process of the spring elements (e.g., longitudinal tolerances) can be easily compensated for via the adjusting means.

A few advantageous embodiments of such adjusting means are described in detail in the following description.

Figure 2:
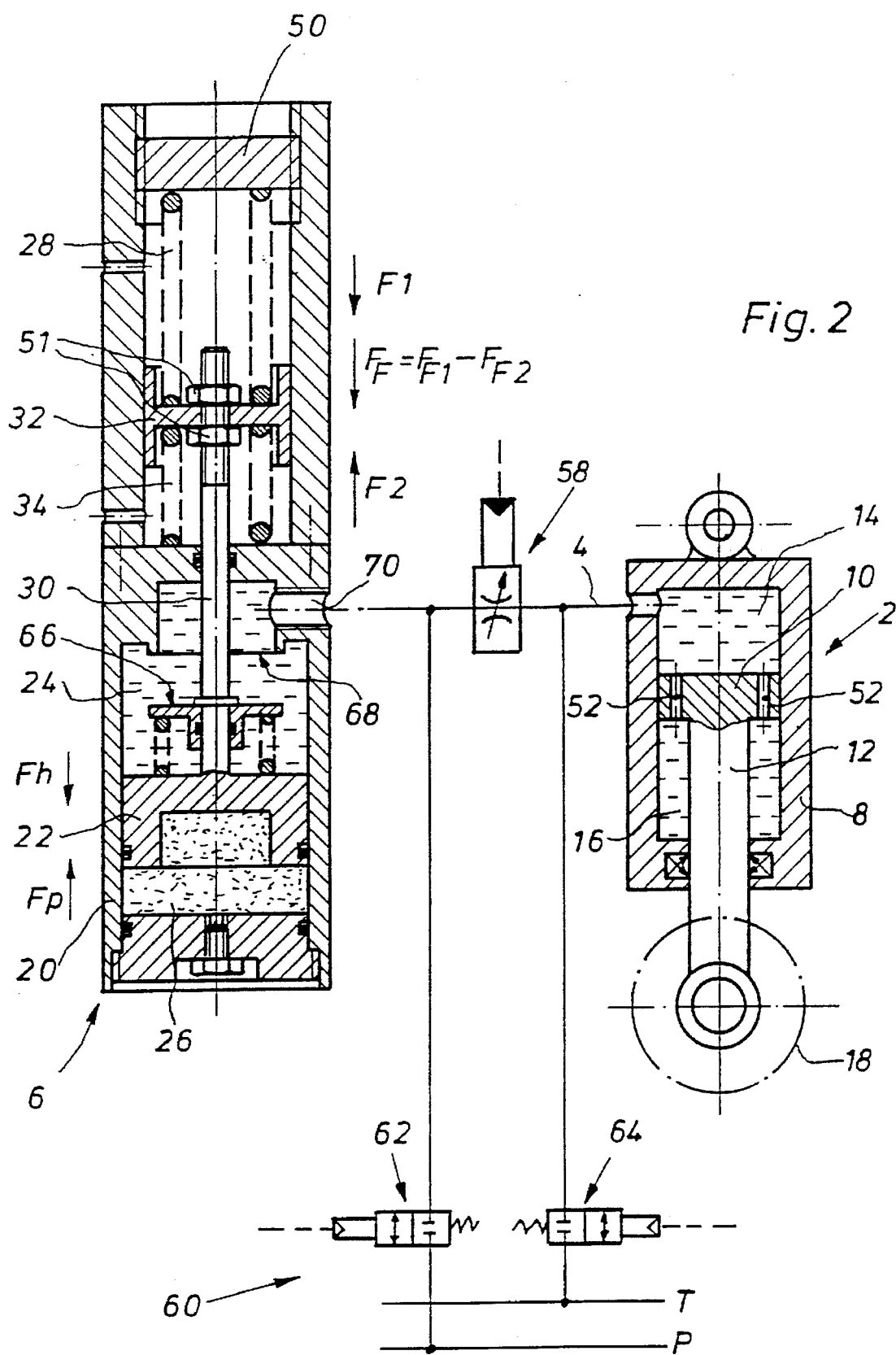
Figure 3:
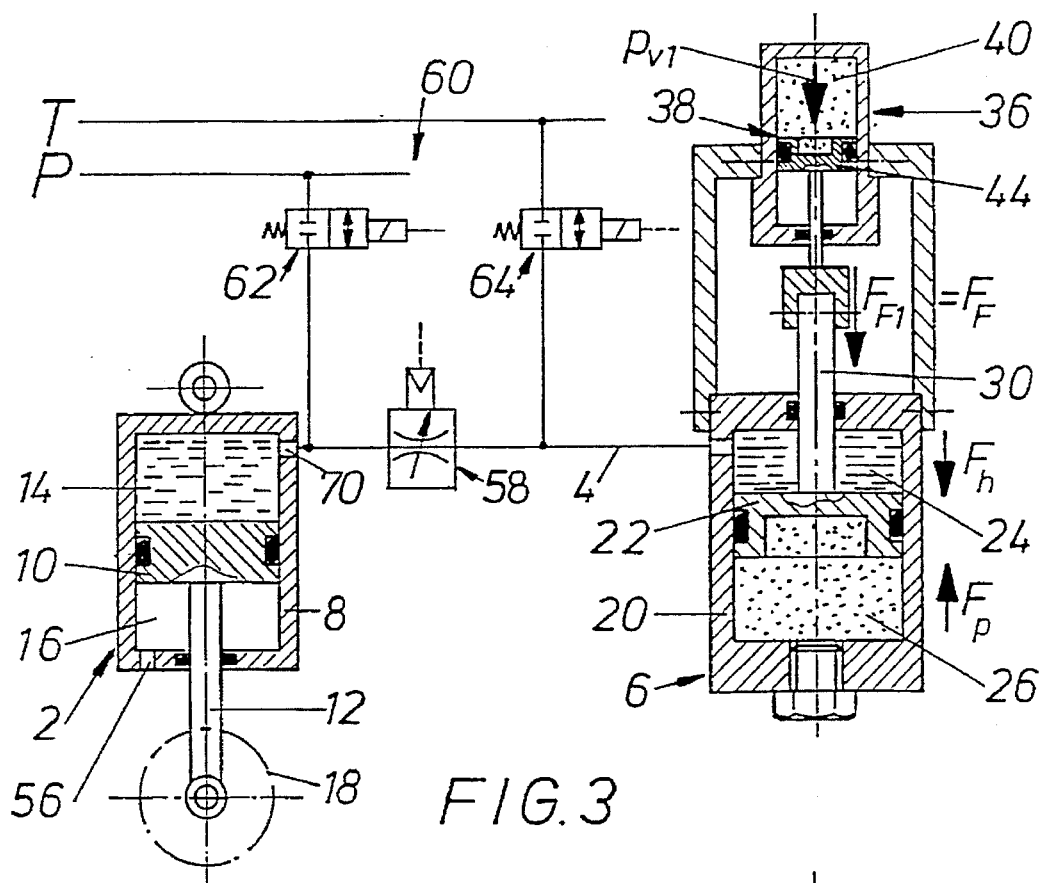
Figure 4:
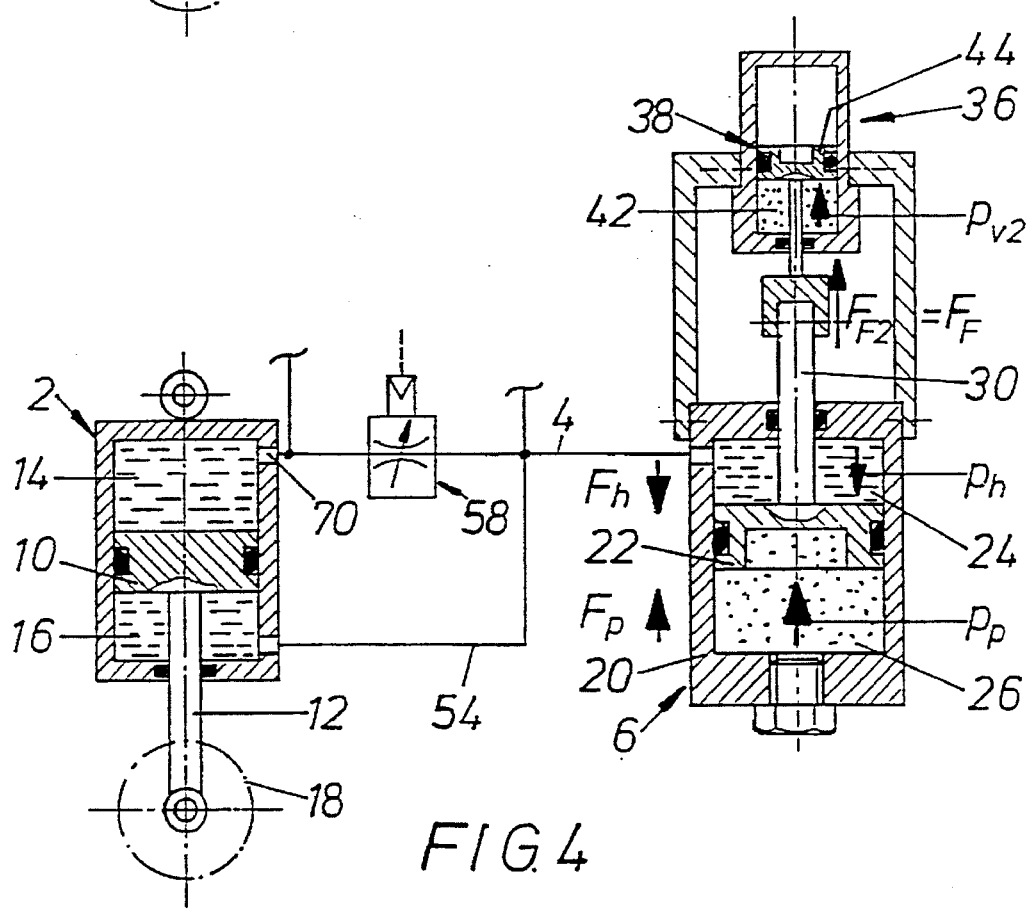
Figure 5:
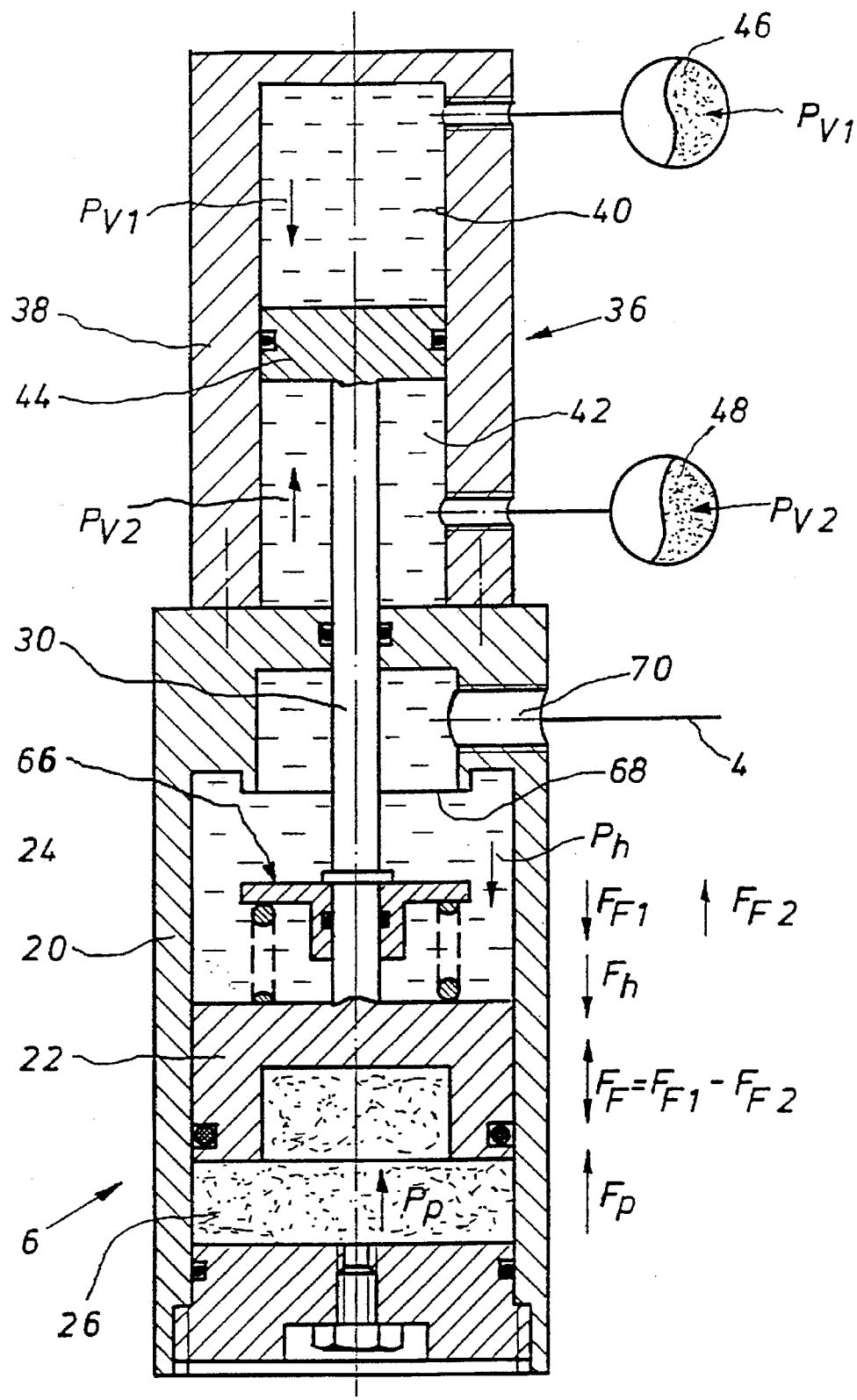
Figure 8:
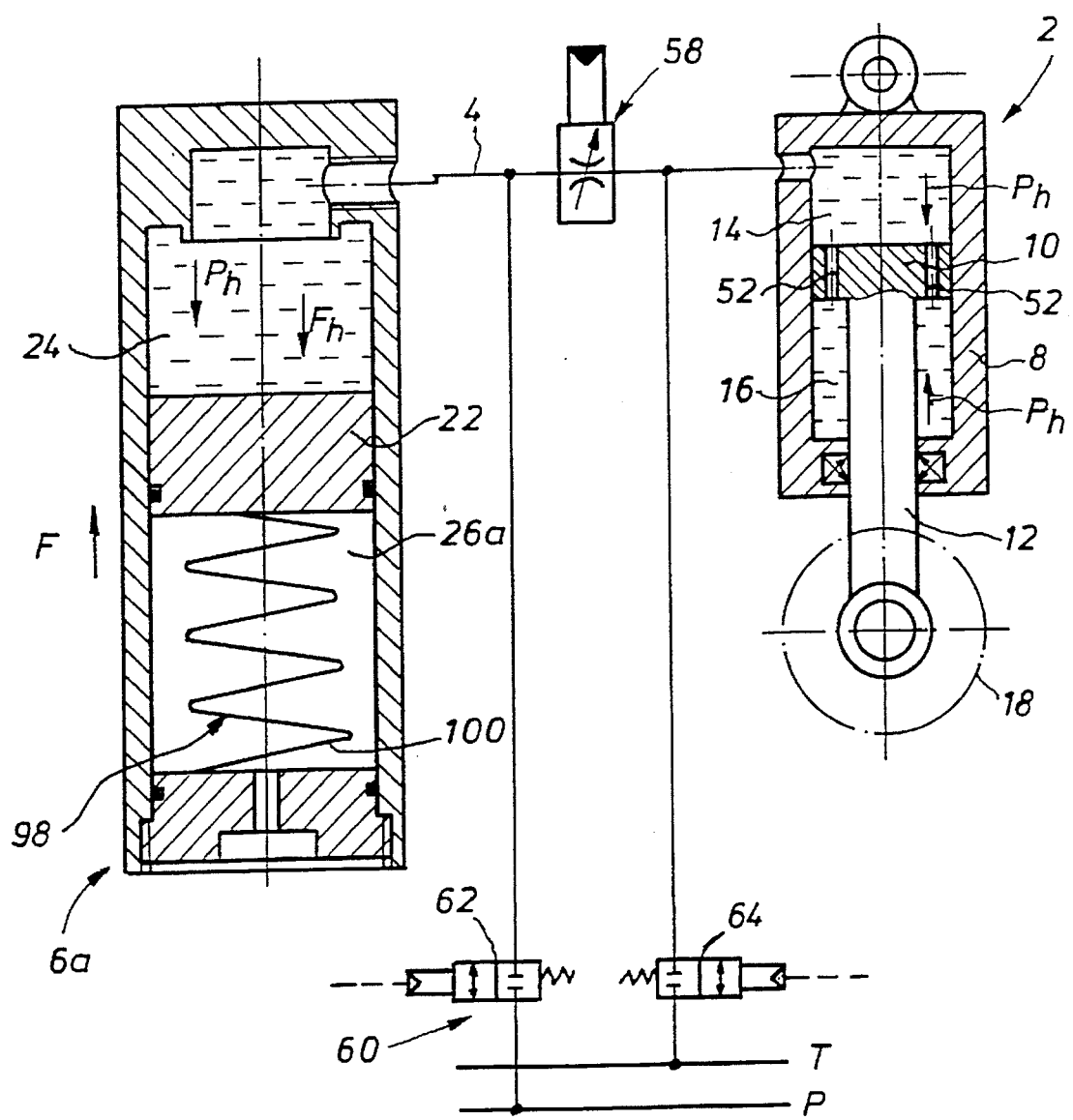

The invention is described in detail below with reference to several embodiments that are illustrated in the enclosed figures. The figures show:

FIG. 1: a first embodiment of the suspension system according to the invention in the form of simplified sectional representations of its components, in particular a strut and a piston-type accumulator, FIG. 2: a view that is analogous to FIG. 1 of a second embodiment, FIG. 3: one additional representation that is analogous to FIG. 1 of a third embodiment, FIG. 4: the essential parts or components of a fourth embodiment of the suspension system according to the invention, FIG. 5: the piston-type accumulator of an additional preferred embodiment of the invention, FIG. 6: a side view of an advantageous development of a piston-type accumulator in which the components are illustrated in the form of a partial axial section, FIG. 7: a detailed partial axial section of the hydropneumatic piston-type accumulator according to FIG. 6, and FIG. 8: one additional possible embodiment of a suspension system.

In the different figures, identical components are always identified by identical reference numerals, so that each description of a component applies to the other respective figures in which this component is also identified by the corresponding reference number.

A suspension system according to the invention consists of at least one hydraulic strut 2 and a hydropneumatic piston-type accumulator 6 that is connected with the aforementioned strut via a hydraulic connection 4.

The strut 2 consists of a cylinder 8, a piston 10 that moves inside of the aforementioned cylinder and a piston rod 12 that is connected with the piston 10 and extends out of the cylinder 8, with said piston separating inside of the cylinder 8 a "load-bearing" cylinder chamber 14, i.e., a cylinder chamber that is under a load-dependent hydraulic pressure $p_h$, from an annular chamber 16 that encloses the piston rod 12. In order to support the wheel or the axle of a motor vehicle, the strut 2 is arranged between a non-sprung mass and a sprung mass, e.g., by connecting the free end of the piston rod 12 with the wheel 18 indicated in the figure or a certain part of the axle and connecting the opposite end of the cylinder 8 with the frame of the motor vehicle. Naturally, a "reversed" installation is also possible.

The piston-type accumulator 6 preferably is designed and arranged spatially independently from the strut 2 and consists of an accumulator cylinder 20, inside of which a separating piston 22 "floats," i.e., is guided in a freely movable fashion. The separating piston 20 divides inside of the accumulator cylinder 20 a hydraulic accumulator chamber 24 that is connected with the strut 2 via the hydraulic connection 4 from a spring chamber 26 that is filled with a compressible medium, in particular a gas.

The load-dependent hydraulic pressure $P_h$ present inside of the cylinder chamber 14 of the strut 2 also acts in the accumulator chamber 24 of the piston-type accumulator 6 via the hydraulic connection 4. A pneumatic pressure $p_p$ is adjusted at this location by displacing the separating piston 22 correspondingly and compressing the compressible medium in the spring chamber 26. Consequently, the separating piston 22 is charged with the hydraulic pressure $p_h$ on its side that faces the accumulator chamber 24 such that a "hydraulic force" $F_h$ that has the tendency to displace the separating piston 22 in the direction of the spring chamber 26 is generated due to the relation $F=p\times A$. However, a "pneumatic force" $F_p$ that is generated by charging the opposite pressure surface of the separating piston 22 with the pneumatic pressure $p_p$ acts opposite to the aforementioned hydraulic force.

According to the invention, it is proposed that the separating piston 22 is—in addition to the hydraulic and pneumatic pressures $p_h$, $p_p$ as well as the forces $F_h$ and $F_p$ resulting thereof—charged with a supplementary spring force $F_F$. There exist several possibilities for charging the separating piston with a supplementary spring force, with a few of these possibilities described below in an exemplary fashion with reference to the individual figures.

According to FIG. 1, the separating piston 22 is charged with a supplementary spring force $F_F$ that acts in the direction of the spring chamber 26 (this supplementary spring force is indicated in FIG. 1 by a continuous arrow). This supplementary spring force is generated by a mechanical spring element 28 that is designed as a helical pressure spring and arranged inside of the accumulator chamber 24. According to the invention, this measure makes it possible that the supplementary spring force $F_F$ is—due to the spring characteristics of the spring element 28—greater for a small load on strut 2, that is if the separating piston 22 is situated in a position in which it is displaced in the direction of a final limit stop on the side of the accumulator chamber 24 (small volume of the accumulator chamber and larger volume of the spring chamber) due to the correspondingly low hydraulic and pneumatic pressures $p_h$ and $p_p$, than at a higher load at which the separating piston 22 is displaced further in the direction of the spring chamber 26 due to the higher pressures $p_h$ and $p_p$. However, the equation $F_p=F_h+F_F$ applies respectively.

One possible alternative to the embodiment according to FIG. 1 consists of the fact that the supplementary spring force $F_F$ (indicated by an arrow drawn with broken lines) charges the separating piston 22 in the direction of the accumulator chamber 24. This may, for example, be realized by designing the spring element 28 in the accumulator chamber 24 as a tension spring. This embodiment realizes an effect that is "opposite" to the aforementioned effect, i.e., the supplementary spring force $F_F$ is less intense at a smaller load of the strut 2 and correspondingly less intense pressures $p_h$, $p_p$ than at a higher load and correspondingly higher pressures $p_h$, $p_p$. In this case, the equation $F_h=F_p+F_F$ or $F_p=F_h-F_F$ applies.

In the embodiment illustrated in FIG. 2, the separating piston 22 is charged with a first spring force $F_{F1}$ (same direction as the hydraulic force $F_h$) as well as an opposing second spring force $F_{F2}$ (same direction as the pneumatic force $F_p$), so that the resulting supplementary spring $F_F$ is obtained from the difference $F_F=F_{F1}-F_{F2}$. Depending on the intensity of the individual spring forces $F_{F1}$ and $F_{F2}$, this results in the separating piston 22 being charged in the direction of the accumulator chamber 24 or in the direction of the spring chamber 26. According to the invention, it is particularly advantageous that the spring characteristics can be adapted in such a way that the resulting supplementary spring force $F_F$ reduces the pneumatic pressure $p_p$ that corresponds with a high load of the strut 2 (the force $F_{F2}$ predominates, while said resulting supplementary spring force increases the pressure $p_p$ that corresponds with a small load (the force $F_{F1}$, predominates). The effects of this measure was already described initially, so that we refer to the introduction of the description for additional explanations.

FIG. 2 also shows that the separating piston 22 of this embodiment is directly charged via a separating piston rod 30 that is connected with said separating piston, with the separating piston rod 30 extending through the accumulator chamber 24 and out of the accumulator cylinder 20 in a sealed fashion. The free end of the separating piston rod 30 is connected with a force transfer element 32 that is charged on one side by a first spring element 28—that functionally corresponds with the spring element 28 in FIG. 1 and is identified by the same reference number—and charged in the opposite direction by a second spring element 34. In the example shown, both spring elements 28 and 34 are designed as helical pressure springs, but said spring elements may also be replaced by tension springs that function correspondingly. In addition, it is possible to use a combination of pressure springs and tension springs.

FIGS. 3, 4 and 5 show embodiments in which a spring element 36 that acts upon the separating piston 22 via the separating piston rod 30 is formed by a cylinder/piston unit 38. This cylinder/piston unit 38 has at least one pressure chamber 40 or 42, inside of which an elastic prestress pressure $p_{v1}$ or $P_{v2}$ is present such that the corresponding spring force $F_F$ or $F_{F1}$, $F_{F2}$ is generated by charging a piston 44.

In the embodiment illustrated in FIG. 3, the pressure chamber 40 is on the side of the piston 44 which is situated opposite to the separating piston 22 and charged with the pressure $p_{v1}$, so that this embodiment functionally corresponds with the one illustrated in FIG. 1 because the supplementary spring force $F_F$ also charges the separating piston 22 in the direction of the spring chamber 26, with said supplementary spring force corresponding with the first spring force $F_{F1}$.

In the embodiment according to FIG. 4, the pressure chamber 42 is arranged on the side of the piston 44 that faces the separating piston 22 and charged with the pressure $P_{v2}$, so that the supplementary spring force $F_F=F_{F2}$ charges the separating piston 22 in the direction of the accumulator chamber 24.

The respective pressure chamber 40, 42 in the embodiments according to FIG. 3 and 4 is filled with a compressible medium, so that the pressure chambers 40, 42 respectively form pneumatic spring chambers.

The embodiments according to FIGS. 3 and 4 naturally may also be combined with one another in such a way that an embodiment that functionally corresponds with the one shown in FIG. 2 is created, with the piston/cylinder unit 38 comprising both pressure chambers 40 and 42; in this case, the following equation applies:

$$F_F = F_{F1} - F_{F2}.$$

This particular embodiment is illustrated in FIG. 5. In this case, the pressure chambers 40 and 42 are not filled with a pneumatic medium, but rather with a hydraulic medium, with each pressure chamber 40, 42 being connected with a hydropneumatic accumulator 46,48.

According to the invention, it is particularly advantageous if the intensity of the respectively effective supplementary spring force $F_F$ ($F_{F1}$, $F_{F2}$) can be changed via an adjusting means. This may, for example, be realized in the embodiment illustrated in FIG. 2 by changing the prestress of at least one of the spring elements 28 and/or 34, e.g., via mechanical adjusting elements 50 and/or 51. In the embodiments according to FIGS. 3–5, at least one of the respective elastic prestress pressures $P_{v1}$ and/or $P_{v2}$ can be varied via suitable pressure adjusting means. This measure advantageously allows an adjustment of the characteristic line of the respectively effective supplementary spring force $F_F$, in a relatively simple fashion and over a very broad range (large field of characteristic lines).

In addition, it is particularly advantageous for certain instances that the respectively effective or resulting supplementary spring force $F_F$ or $F_{F1} - F_{F2}$ does not have a linear, but rather a progressive or degressive or s-shaped course over the path of the separating piston 22. In the instance of an s-shaped course, the characteristic line is either initially degressive and subsequently progressive or initially progressive and subsequently degressive. In other words, the effective spring element-which possibly is realized by "combining" several spring elements—has a spring stiffness c (force change per path unit) that changes over the entire path; the relation c=ΔF/Δs applies. This particularly advantageous measure can be explained as follows.

The natural frequency f of a suspension system depends on the mass m due to the relation $$f = \frac{1}{2\pi} \cdot \sqrt{\frac{c}{m}}.$$

Consequently, a load change in a motor vehicle would also cause a detuning of the suspension due to the change of the natural frequency f. According to the invention, the spring stiffness c that changes in dependence on the path is selected such that—depending on the respective instance—the natural frequency f remains at least approximately constant or is changed intentionally in order to be optimally adapted to the respective load.

A few variations of the suspension system according to the invention are described below.

In the embodiments according to FIGS. 1, 2 and 4, the annular chamber 16 of the strut 2 is hydraulically connected with the cylinder chamber 14, so that the hydraulic pressure $p_h$ is also present at this location. The pressure surface of the piston 10 which is decisive for generating the carrying force is obtained from the difference of the two opposing piston surfaces; the effective pressure surface consequently corresponds with the cross section of the piston rod 12. In the embodiments according to FIGS. 1 and 2, the piston 10 is provided with through passages 52 in order to realize this hydraulic connection, with the hydraulic medium being able to flow back and forth between the chambers 14 and 16 via said through passages. FIG. 4 shows an alternative solution in which the annular chamber 16 is connected with the cylinder chamber 14 via an external connection 54. In these embodiments, a piston seal for the piston 10 is no longer required.

In the embodiment according to FIG. 3, the annular chamber 16 of the strut 2 is connected with the atmosphere via a ventilation opening 56 of the cylinder 8, so that this side of the piston is practically unpressurized (atmospheric pressure). Due to this design, the entire surface of the piston 10 which faces the cylinder chamber 14 is decisive for generating the carrying force. This measure makes it possible to construct the strut 2 in a very compact fashion, also for very heavy loads. Consequently, this embodiment is particularly suitable for motor trucks.

It is also advantageous if the flow of the hydraulic medium between the strut 2 and the piston-type accumulator 6 is dampened, in particular during the rebound travel of the strut 2. For this purpose, it is practical to arrange a damping valve 58 that, in particular, may be controlled or regulated in dependence on the load in the hydraulic connection 4 between the strut 2 and the piston-type accumulator (16). Alternatively, a cut-off valve—that, however, is not illustrated in the figures—may be arranged in this hydraulic connection 4, with said cut-off valve being able to "decouple" the accumulator 6 from the strut 2 such that a blocking of the deflection and rebound movements of the strut can be attained.

It is advantageous if the strut 2 or its cylinder chamber 14 is connected with a hydraulic leveling device 60 that in the embodiment shown consists of two on-off valves 62, 64. The intake side of these on-off valves is connected with a pressure line P as well as a tank line T, with the output side of said valves being connected with the cylinder chamber 14, so that the latter may be selectively connected with the pressure line P or the tank line T. This measure makes it possible to adjust the level of the strut 2 by introducing or removing the hydraulic medium. This level adjustment may also be carried out automatically, by means of suitable level sensors that acquire the respective position of the strut 2—e.g., by measuring the distance between the axle and the frame.

For reasons of completeness, it should be mentioned that the piston-type accumulator 6 is, due to the separating piston rod 40 that is connected with the separating piston 22, basically constructed as a pressure transducer in such a way that the pneumatic pressure $p_p$ is "usually" always less intense than the hydraulic pressure $p_h$. However, this pressure difference is influenced respectively by charging the separating piston 22 with the supplementary spring force $F_F$ according to the invention. Depending on the supplementary spring characteristics, this can lead to the pneumatic pressure becoming slightly more intense than the pneumatic pressure beginning at a certain load condition. However, this can be easily prevented by means of a suitable design.

One advantageous development of the piston-type accumulator 6 is described below. In this case, the separating piston 22 is provided with a closure element 66 on the side of the accumulator chamber 24, with said closure element closing a hydraulic connection 70 that exits into the accumulator chamber 24 if the separating piston 22 is displaced into a cut-off position in the direction of a final limit stop 68 on the side of the accumulator chamber, namely in such a way that a closed pressure chamber (not illustrated in the figures) that has the residual volume of the accumulator chamber 24 is formed. In this case, the closure element 66 is constructed elastically or arranged such that it may be moved elastically relative to the separating piston 22 in such a way that the separating piston 22 can be moved at least slightly beyond the cut-off position in the direction of the final limit stop 68 against the force of a spring. This design has the purpose of insuring a hermetic seal of the spring chamber against the discharge of the compressible medium under all possible operating conditions. Such leaks in particular can occur if the accumulator chamber is essentially unpressurized and the separating piston adjoins the final limit stop on the side of the accumulator chamber (final rebound position) due to the pneumatic pressure. This can, for example, occur if the spring chamber is already filled with a certain pneumatic prestress pressure while the accumulator chamber is not yet hydraulically pressurized during the manufacture of the piston-type accumulator.

This critical condition also occurs if the strut 2 is entirely alleviated from all loads. In these instances, the pneumatic pressure is substantially more intense than the pressure inside of the accumulator chamber, which is the reason why the compressible medium could be discharged via the separating piston seal and the accumulator chamber. Due to the preferred closure element 66, the separating piston 22 braces itself on a hydraulic medium (hydraulic cushion) that is enclosed in the pressure chamber formed in the cut-off position, i.e., before the separating piston reaches the mechanical final limit stop 68 on the side of the accumulator chamber, so that a corresponding counter pressure is always adjusted automatically on the side of the accumulator chamber or the pressure chamber due to the fact that the separating piston 22 is still able to carry out an axial movement in this position and said separating piston is charged with the pneumatic pressure. This counter pressure is advantageously adapted automatically if the pneumatic pressure changes, e.g., due to the temperature. This measure insures that the separating piston seal is always charged with pressures that are adapted to one another on both sides, so that said separating piston seal never needs to provide a seal against the full pneumatic pressure. Additional constructive details regarding the closure element 66 are contained in the publication German Patent No. U 9,012,936, to which we refer in its entirety at this point.

One additional and particularly advantageous development of the invention is described below with reference to FIGS. 6 and 7. This development pertains to those embodiments in which the separating piston 22 is charged by at least one mechanical spring element 28 via the separating piston rod 30.

In piston-type accumulators for hydropneumatic suspension systems, it is very important that the separating piston can be moved very easily, i.e., at very minute pressure changes, in order to insure an optimal function of the suspension system. In order to always insure this movability of the separating piston, the spring element 28 is, according to the invention, braced on at least one end via an abutment element that is connected with the accumulator cylinder 20 or the separating piston rod 30 in a pivoting fashion in such a way that, if the effective axes of the spring element and the accumulator cylinder are offset due to a relative movement between the abutment element and the cylinder or the piston rod, an automatic adaptation of the effective axes takes place.

The aforementioned measure according to the invention is based on the idea that the effective axis (axis of the direction of force) frequently deviates from the effective axis (moving axis) of the piston-type accumulator due to non-parallelism, namely due to the manufacture and/or the design of the springs, primarily mechanically acting helical springs. This can, for example, be caused by the fact that a helical pressure spring usually "bulges" from its effective axis when being compressed such that an altered direction of force is obtained. Consequently, it is possible that the spring does not only charge the piston rod in its axial direction, but that a transverse force component is created that could tilt the piston rod so intensely that a movement of the piston is substantially impaired due to the increased friction or even entirely impossible in severe instances.

The present invention eliminates this disadvantageous effect with very simple constructive means because each transverse force generated by the spring causes a corresponding and automatic relative pivoting of the respective abutment element until the effective axis of the piston-type accumulator coincides with the effective axis of the spring. In this case, the piston rod is advantageously charged with only one exactly axially directed force, so that friction or jamming caused by a tilting of the piston is eliminated.

FIGS. 6 and 7 show in detail that one end of the spring element 28 is braced on the accumulator cylinder 20 and the other end of said spring element is braced on the free end of the separating piston rod 30. In the embodiments shown, the spring element 28 is formed by a helical spring (pressure or tension spring) 80 that is wound of spring wire. This spring 80 essentially encloses the accumulator cylinder 20 and the separating piston rod 30 and is prestressed between a first abutment element 82 that is fastened onto the free end of the separating piston rod 30 and preferably has the shape of a disk and a second abutment element 84 that is arranged within the region of the axially opposing closed end of the accumulator cylinder 20.

In "normal instances," the effective axes of the spring element 28 (axis of the spring force) and the piston-type accumulator 6 (moving axis of the separating piston 22 and the separating piston rod 30) should coincide as shown in the figures, which is the reason why only one common effective axis 86 is shown in FIGS. 6 and 7. In reality, these two effective axes frequently deviate from one another.

Consequently, it is proposed that the spring 80 in the preferred embodiments of the invention directly engages on the accumulator cylinder 20 on the side of the cylinder, which is the reason why the second abutment element 84—that preferably is part of a cylinder holding element 88—is connected in a pivoting fashion with the accumulator cylinder 20 in such a way that an automatic relative pivoting movement (compare with the double arrow 90) takes place if the effective axis of the cylinder and the one of the spring element 28 deviate from one another until both effective axes 86 coincide or are at least aligned parallel to one another.

If the effective axes are offset to one another, the relative pivoting movement according to the invention advantageously takes place between the accumulator cylinder 20 and the second abutment element 84 for the spring 80, so that an adaptation of the effective axis is carried out by changing the inclination (angle to the effective axis of the cylinder) of a supporting plane of the spring 80 that is defined by the abutment element 84.

Additionally or alternatively, it is possible to connect the abutment element 82 with the separating piston rod 30 in a pivoting fashion on the side of the piston rod. However, in the examples shown, a practically rigid connection, i.e., a non-pivoting connection, is provided at this location.

FIGS. 6 and 7 show that the accumulator cylinder 20 is preferably connected with the cylinder holding element 88 or the second abutment element 84 via a ball joint 92. In this case, the accumulator cylinder 20 preferably is connected with the ball 94 and the cylinder mounting 88 is provided with a ball receptacle (ball socket) 96.

The measure for "automatically adapting the effective axes" between a cylinder and a spring cannot only be applied in piston-type accumulators, but also in other piston/cylinder units in which a mechanical spring engages between a cylinder and a piston rod; this is, for example, the case with so-called "struts" (shock absorbers).

The invention is not limited to the embodiments that are illustrated in the figures and were described previously, but rather also includes all embodiments that function identically in the sense of the invention. It is, in particular, also possible to use other suitable spring elements for generating the supplementary spring force or to provide a combination of different spring elements.

The invention also is not limited to the combination of characteristics defined in claim 1, but may also be defined by any arbitrary other combination of certain characteristics of all individual characteristics disclosed. This means that any individual characteristic of claim 1 can basically be omitted or replaced by at least one individual characteristic disclosed at a different text portion of the application. To that extent, the claims only represent a first attempt for formulating the invention.

Consequently, the invention also pertains to a suspension system as it is illustrated in FIG. 8. This suspension system is not a hydropneumatic suspension system, but rather a hydraulic-mechanical suspension system since a piston/spring accumulator 6a is used that does not contain a pneumatic medium in its spring chamber 26a. In this case, the accumulator piston 22a is charged with a spring force F that counteracts the hydraulic force $F_h$. In the example shown, this is realized by a mechanical spring element 98 that is constructed as a helical pressure spring 100 and arranged inside of the spring chamber 26a of the spring accumulator 6a, with the spring chamber 26a being connected with the atmosphere via a ventilation opening such that atmospheric pressure is present in said spring chamber. Alternatively, it is also possible to arrange a tension spring element, e.g., in the accumulator chamber 24, for generating the spring force F.

The spring characteristic of the spring element 98 is adapted to the respective design of the system components in such a way that it is always insured that the spring force F acts opposite to the hydraulic force and lies on the order of the hydraulic force that is generated by the hydraulic pressure present in dependence on the load. This means that the spring element 98 has only little stiffness ("weak spring") if the accumulator 6a is designed with a small piston surface that is charged by the hydraulic pressure—and a correspondingly large piston travel (for accommodating the respective hydraulic medium displaced)—while the spring has a more intense stiffness ("strong spring") if the accumulator is designed with a larger piston surface—and a correspondingly shorter piston travel.

The essential advantage of this design can be seen in the fact that the same superior spring characteristic and consequently an optimal road feel can practically be obtained during an empty load and a full load of the strut 2. Sealing problems within the region of the accumulator practically no longer occur since the ring of the accumulator piston 22a only needs to seal against the hydraulic pressure. In addition, the piston-spring accumulator 6a can be designed for particularly long spring travels in a very simple fashion by constructing said piston-spring accumulator correspondingly long (primarily a long spring chamber 26a and a long spring element 98). Due to the fact that the strut 2 is designed as a separate component, the spring accumulator 6a can, despite its length, be easily accommodated in a motor vehicle, e.g., arranged horizontally along a part of the frame of the motor vehicle.

I claim:

1. Hydropneumatic suspension system for motor vehicles, comprising:

at least one hydraulic strut (2) that during deflection and rebound movement acts via a hydraulic medium upon at least one hydropneumatic piston-type accumulator (6) that has a separating piston (22) being guided within an accumulator cylinder (20) in a freely movable fashion, and separating inside of said accumulator cylinder (20) a hydraulic accumulator chamber (24) from a spring chamber (26);

said hydraulic accumulator chamber (24) being connected to said hydraulic strut (2) via a hydraulic connection (4);

said spring chamber (26) containing a compressible medium;

a hydraulic pressure (ph) that originates from the accumulator chamber (24) and a pneumatic pressure (pp) that originates from the spring chamber (26) acting upon two opposite sides of said separating piston (22);

at least one supplementary spring having a supplementary spring force (FF;F1;F2) acting upon the separating piston (22) of the piston-type accumulator (6) in addition to the forces (Fh,Fp) resulting from charging the separating piston (22) with the hydraulic pressure (ph) and the pneumatic pressure (pp);

the separating piston (22) of the piston-type accumulator (6) being connected with a separating piston rod (30) extending through the hydraulic accumulator chamber (24) and out of the accumulator cylinder (20) in a sealed fashion; and the supplementary spring force (FF;FF1;FF2) being generated by at least one spring element (34;36) comprising a piston/cylinder unit (38) located outside of the piston-type accumulator (6) and having at least one pressure chamber (40,42) inside of which is a medium exerting an elastic prestress pressure ($p_{v1}, p_{v2}$) directly operatively associated with the separating piston rod (30) to apply the supplementary spring force acting on the separating piston (22) within the accumulator (6), thereby reducing the volume of the compressible medium required for a particular load ratio of the strut.

2. Suspension system according to claim 1, characterized by the fact that the supplementary spring force (FF; FF1) charges the separating piston (22) in the direction of the hydraulic force (Fh) that results from the hydraulic pressure, namely in such a way that the supplementary spring force is more intense at a low hydraulic pressure (ph) than at a high hydraulic pressure (ph).

3. Suspension system according to claim 1, characterized by the fact that the supplementary spring force (FF;FF2) charges the separating piston (22) in the direction of the pneumatic force (Fp) that results from the pneumatic pressure, namely in such a way that the supplementary spring force is less intense at a low hydraulic pressure (ph) than at a high hydraulic pressure (ph).

4. Suspension system according to claim 1, characterized by the fact that the pressure chamber(s) (40,42) of the piston/cylinder unit (38) is filled with a compressible medium that is pressurized with the elastic prestress pressure (pv1,pv2).

5. Suspension system according to claim 1, characterized by the fact that the intensity of the supplementary spring force (FF;FF1 ;FF2) can be altered via adjusting means.

6. Suspension system according to claim 1, characterized by the fact that the supplementary spring force (FF;FF1 ;FF2) does not have a linear course over the path of the separating piston (22), but rather has one of a progressive or degressive or S-shaped course.

7. Suspension system according to claim 1, characterized by the fact that the strut (2) comprises a cylinder chamber (14) that is hydraulically connected with the piston accumulator (6) as well as an annular chamber (16) that encloses a piston rod (12) and is separated from the aforementioned cylinder chamber by means of a piston (10), with the annular chamber (16) being either hydraulically connected with the cylinder chamber (14) or with the atmosphere via a ventilation opening (56).

8. Suspension system according to claim 1, characterized by the fact that a damping valve (58) that is adjustable in dependence on the load is arranged in a hydraulic connection (4) between the strut (2) and the piston-type accumulator (6).

9. Suspension system according to claim 1, characterized by the fact that the strut (2) is selectively connected with a hydraulic pressure line (P) or a tank return line (T) via a leveling device (60).

10. The suspension system according to claim 1, wherein:

the spring element (36) comprises a gas spring located partially within the hydraulic accumulator chamber (24) and having a piston (44) operatively associated with the separating piston rod (30).

11. The suspension system as in claim 10, wherein:

the gas spring comprises two chambers separated by the piston (44) operatively associated with the piston rod, and one of said chambers is filled with a pneumatic medium.

* * * * *

UNITED STATES PATENT AND TRADEMARK OFFICE
CERTIFICATE OF CORRECTION

PATENT NO. : 5,624,105
DATED : April 29, 1997
INVENTOR(S) : Walter Runkel

It is certified that error appears in the above-indentified patent and that said Letters Patent is hereby corrected as shown below:

Column 14, line 42, "forte" should be --force--.

Signed and Sealed this

Fifth Day of August, 1997

Attest:

BRUCE LEHMAN

Attesting Officer

Commissioner of Patents and Trademarks